US005968135A

United States Patent [19]

Teramoto et al.

[11] Patent Number: 5,968,135

[45] Date of Patent: Oct. 19, 1999

[54] PROCESSING INSTRUCTIONS UP TO LOAD INSTRUCTION AFTER EXECUTING SYNC FLAG MONITOR INSTRUCTION DURING PLURAL PROCESSOR SHARED MEMORY STORE/LOAD ACCESS SYNCHRONIZATION

[75] Inventors: Yasuhiro Teramoto, Hadano; Toshimitsu Andoh, Isehara; Tadaaki Isobe, Hadano; Naonobu Sukegawa, Kokubunji; Yuko Ishibashi, Machida, all of Japan

[73] Assignee: Hitachi, Ltd., Tokyo, Japan

[21] Appl. No.: 08/972,539

[22] Filed: Nov. 18, 1997

[30] Foreign Application Priority Data

Nov. 18, 1996 [JP] Japan .................................... 8-306209

[51] Int. Cl.[6] ................................................ G06F 15/167

[52] U.S. Cl. ............................... 709/400; 709/248; 709/7

[58] Field of Search .................................. 709/400, 248, 709/7

[56] References Cited

U.S. PATENT DOCUMENTS

| | | | |
|---|---|---|---|
| 5,307,483 | 4/1994 | Knipfer et al. . | |
| 5,361,369 | 11/1994 | Kametani | 709/7 |
| 5,448,732 | 9/1995 | Matsumoto | 709/5 |
| 5,787,272 | 7/1998 | Gupta et al. | 709/400 |

FOREIGN PATENT DOCUMENTS

| | | |
|---|---|---|
| 3144847 | 6/1991 | Japan . |
| 460 743 | 2/1992 | Japan . |

*Primary Examiner*—Kenneth S. Kim
*Attorney, Agent, or Firm*—Antonelli, Terry, Stout & Kraus, LLP

[57] ABSTRACT

An information processing system is connected to a common storage and executes programs by use of processors. This system includes a common storage; a plurality of processors, connected to the common storage. Each processor executes an instruction to store data from common storage, and an instruction to load data from the common storage into the cache storage, wherein each processor includes a communication controller for, when detecting synchronization completion information for attaining synchronization of execution of instructions among a plurality of processors, sending synchronization completion information and receiving synchronization information from another processor; an instruction executing section for detecting a specified change of the flag of a specified location in the common storage by executing a Monitor instruction included in a program in response to synchronization information from the communication controller; an execution controller to execute subsequent instructions after the Monitor instruction, exclusive of a Load instruction to load data into a cache storage, until a change of the flag is detected by the execution section, wherein the processor allows instruction for loading data from common storage into the cache storage to be executed after the flag detection, and wherein the execution controller may include an inhibit resetting circuit to issue an inhibit instruction control signal to terminate the instruction send-out inhibiting action of the instruction inhibit circuit according to input from a service processor.

14 Claims, 14 Drawing Sheets

FIG. 8

| INSTRUCTION STREAM OF PROCESSOR 1 ISSUING INFORMATION ABOUT SYNC COMPLETION | INSTRUCTION STREAM OF PROCESSOR 2 SUBJECTED TO SYNCHRONIZATION |
| --- | --- |
| INSTN.1 · · · ST (OPERATION DATA) | INSTN.4 · · · WAIT (SHARED AREA FOR SYNC.COMPLETION INFO) |
| INSTN.2 · · · SYNC | INSTN.5 · · · LD (OPERATION DATA) |
| INSTN.3 · · · ST (SHARED AREA FOR SYNC.COMPLETION INFO) | INSTN.6 · · · ARITHMETIC INSTRUCTION |
| | INSTN.7 · · · BRANCH INSTRUCTION |
| | INSTN.8 · · · ANY INSTRUCTION USING RESULT OF LOAD (INST.5) |

FIG. 9

| INSTRUCTION STREAM OF PROCESSOR 1 ISSUING INFORMATION ABOUT SYNCHRONIZATION COMPLETION | INSTRUCTION STREAM OF PROCESSOR 2 SUBJECTED TO SYNCHRONIZATION |
|---|---|
| INSTN.1 · · · ST (OPERATION DATA)<br>INSTN.2 · · · WAC<br>INSTN.3 · · · ST (SHARED AREA FOR SYNC.COMPLETION INFORMATION) | INSTN.4 · · · WAC<br>INSTN.5 · · · WAIT (SHARED AREA FOR SYNC.COMPLETION INFORMATION)<br>INSTN.6 · · · PRE-FETCH INSTRUCTION<br>INSTN.7 · · · LD (OPERATION DATA) |

FIG. 10

INSTN.1 · · · LD TO MONITOR SYNC.COMPLETION
INSTN.2 · · · BC BRANCH TO INSTN.1 ON CONDITION
INSTN.3 · · · LD
INSTN.4 · · · LD ARITHMETIC INSTRUCTION
INSTN.5 · · · LD BRANCH INSTRUCTION

FIG. 12

INSTN.1 · · · WAIT (TO MONITOR SYNC.COMPLETION)
INSTN.2 · · · LD
INSTN.3 · · · ARITHMETIC INSTRUCTION
INSTN.4 · · · BRANCH INSTRUCTION

PROCESSING INSTRUCTIONS UP TO LOAD INSTRUCTION AFTER EXECUTING SYNC FLAG MONITOR INSTRUCTION DURING PLURAL PROCESSOR SHARED MEMORY STORE/LOAD ACCESS SYNCHRONIZATION

BACKGROUND OF THE INVENTION

The present invention relates to an instruction execution control method and information processing apparatus for monitoring information about the completion of synchronization among processors, and selectively causing a specific instruction of the subsequent group of instructions to wait until the completion of synchronization is indicated when the processors are operated in synchronism with each other for synchronous execution of their respective processes in a computer system including a plurality of processors.

The synchronized operation of the processors for synchronous execution of processes has conventionally been done between an instruction stream of a synchronization notifying processor issuing a SYNC request and an instruction stream of a processor which is subjected to synchronization.

More specifically, in response to a Store instruction (ST: instruction 1), the processor, which will subsequently issue a SYNC request, outputs data of a preliminary process or a result of a process to the main storage, and when a SYNC instruction (instn. 2) is issued, this SYNC instruction serves to ensure that writing of the above-mentioned result into the main storage is finished. Then, the completion of synchronization is notified by a Store instruction (ST) to the synchronized-side processor, to more specific, by the use of communication means between the two processors or according to a value written into the specified location in the common (shared) storage area in the main storage, for example.

On the other hand, by using an LD (Load) instruction (instn. 4), the synchronized-side processor receives information about synchronization completion through the communication means between the two processors or reads this information which is written in the above-mentioned location of the common storage, a representative one of which is the main storage, or waits for synchronization completion by monitoring the common storage by repeating the Load instruction (instn. 4) by issuing a BC (conditional Branch) instruction (instn. 5) until the completion of synchronization is notified from the synchronization notifying processor. When this information about the completion of synchronization is transferred between the two processors, the synchronized-side processor gets out of a spin loop of Load (instn. 4) for monitoring and conditional Branch (instn. 5), and performs subsequent processes.

The above-mentioned spin loop is used to wait for information about synchronization completion by repeating a condition test incessantly. In a synchronization operation for exclusive access control, a scheme for attaining synchronization is adopted in which the processors wait for information about the completion of synchronization which gives an access permission to an exclusive location, that is, a location where that information is written by a Store instruction prior to a TS instruction by using a spin-lock-wait operation, which is achieved by a combined use of a TS (Test and Set) instruction (instn. 1) to test an area where information about synchronization completion and a BC (conditional Branch) instruction (instn. 2).

More specifically, the Test and Set instruction is used to test an area where synchronization information is written and read, in other words, to test a flag area in the main storage (to be more concrete, a value is input and evaluated), and set (1 is written if the evaluated value is 0). The Test and Set instruction is an instruction with a lock to prohibit access to the flag area from another processor. As has been described, in the spin loop method or the spin-lock-wait method, waiting for information about the completion of synchronization is done by using a Load information to monitor this information and a Branch instruction to repeat the Load instruction until synchronization completion is notified.

In the conventional synchronization method mentioned above, after a Load instruction for monitoring the common storage area and a Branch instruction for repeating the Load instruction have been set, the next instruction in the remaining instructions of the program is not performed until information about the completion of synchronization is given.

In the synchronized-side processor, however, the only instruction which needs to be put in the waiting state until information about the completion of synchronization is issued is a Load instruction which is likely to transfer information from the main storage to the register or the cache storage in the synchronized-side processor before updating when the synchronization notifying processor updates the contents of the main storage by a Store instruction to store data of a preliminary process or a result of a process. In spite of this, an arithmetic instruction or a Branch instruction which is nothing to do with the Load instruction is forced to wait to no purpose.

To put differently, when information about the completion of synchronization is received, an arithmetic instruction or a Branch instruction which needs to be executed in advance regardless of the order of instructions written in the program. Accordingly, the efficiency of instruction execution in synchronized operations is decreased.

SUMMARY OF THE INVENTION

An object of the present invention is to provide an instruction execution control method and an information processing apparatus for enabling synchronized operations to be performed at high speed among a plurality of processors sharing a main storage.

Another object of the present invention is to provide an instruction execution control method and an information processing apparatus for enabling synchronized operations to be performed at high speed among a plurality of processors by realizing a process in which, when synchronized operations are performed among a plurality of processors, by putting a Load instruction in a queue and executing an arithmetic instruction or a Branch instruction which need not be put in a queue or in the wait state, and after synchronization has been completed, executing the Load instruction which has been delayed.

According to the present invention, there is provided an information processing system having a plurality of processors connected to a common storage and processing respective programs, the processor for executing an instruction to store data in the common memory and an instruction to load data from the common storage into the cache storage, the processor, comprising:

- a communication controller for receiving synchronization information from a processor which has detected a SYNC instruction to achieve synchronization of the execution of instructions among a plurality of processors;

an instruction executing section for checking specified changes of the flag at a specified location in the common storage by executing a Monitor instruction included in a program in response to the synchronization information from the communication controller;

an execution controller to execute instructions subsequent to the Monitor instruction, excluding a Load instruction to load data into the cache, until a change of the flag is detected by the instruction execution section.

wherein the processor allows the instruction for loading data from the common storage into the cache storage to be executed after the flag detection.

This processor can further comprise:

an instruction queue for storing instructions to be executed in the processor;

an operation code circuit, connected to the instruction queue, for converting a signal corresponding to a change of the flag into an operation code of the load instruction;

a comparator for comparing output of the operation code circuit and output of the instruction queue and issuing a coincidence signal when those outputs coincide with each other; and an instruction inhibiting circuit, connected to the comparator circuit and the instruction queue, for controlling the instruction inhibiting circuit and the instruction queue so as not to send an instruction output from the instruction queue to the instruction execution section in response to a coincidence signal, wherein the execution controller can further comprise an inhibit resetting circuit for issuing an inhibited instruction control signal to terminate the instruction send-out inhibiting action of the instruction inhibiting circuit by an input signal.

BRIEF DESCRIPTION OF THE DRAWINGS

FIG. 8 shows an instruction stream of the synchronization notifying processor and an instruction stream of the synchronized-side processor;

FIG. 9 shows an instruction stream of the synchronization notifying processor and an instruction stream, including a Pre-fetch instruction, of the synchronized-side processor;

FIG. 10 shows an instruction stream to monitor information about synchronization completion according to the prior art;

FIG. 12 shows an instruction stream including an instruction to monitor information about synchronization completion according to the present invention.

DETAILED DESCRIPTION OF THE PREFERRED EMBODIMENT

Preferred embodiments of the present invention will be described with reference to the accompanying drawings.

[Embodiment 1]

Figure 1:
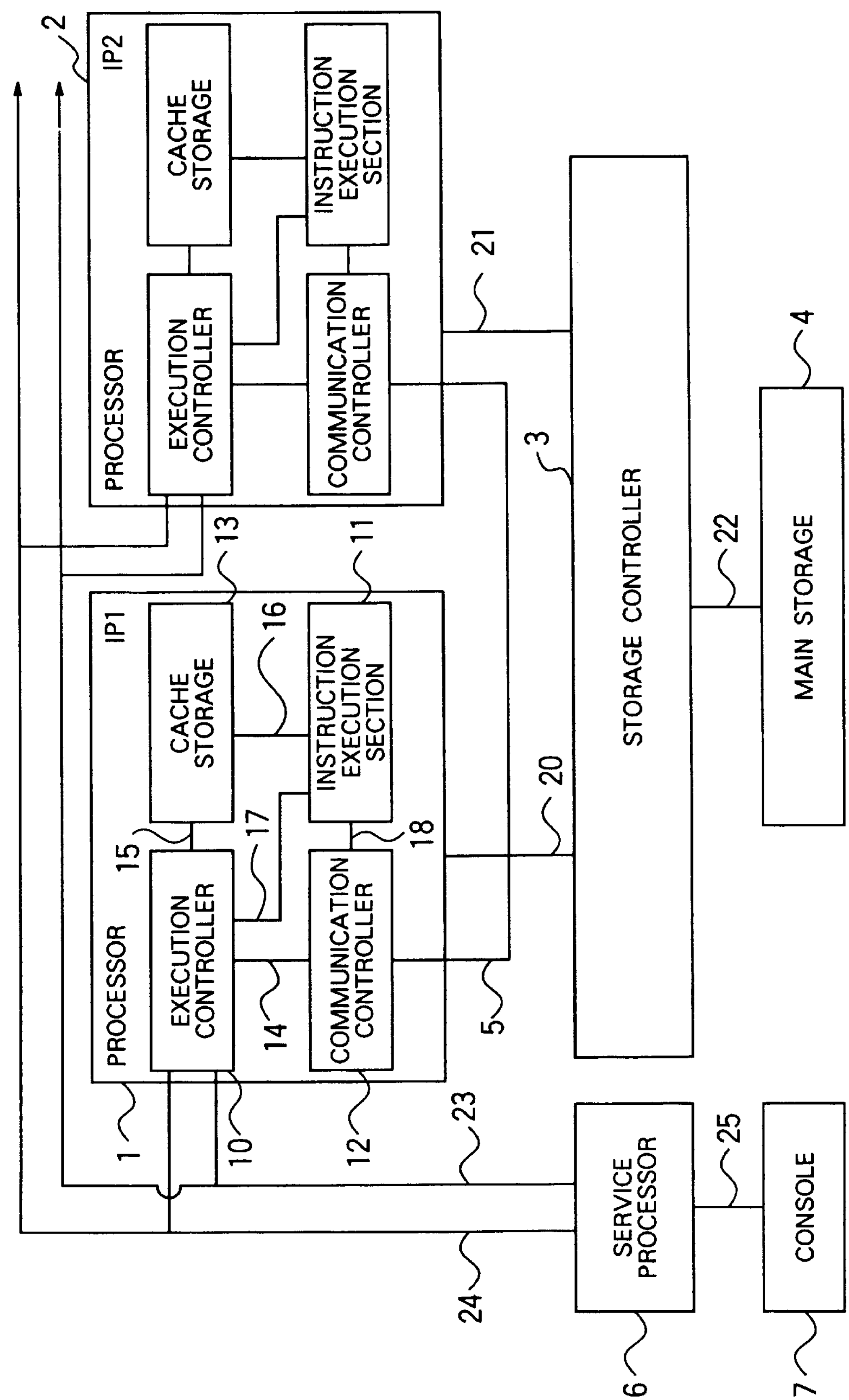
FIG. 1 is a system block diagram of the information processing apparatus according to an embodiment of the present invention.

FIG. 1 is a system block diagram of the information processing apparatus according to a first embodiment of the present invention. The information processing apparatus according to the first embodiment includes a plurality of processors (IP) 1, 2, a storage controller (SC) 3, a main storage (MS) 4, a service processor (SVP) 6, and a console (CD) 7. The IPs 1, 2, operating in synchronism with each other, share the processes from a program, and execute instructions, such as an arithmetic instruction and an MS access instruction.

To make access to MS 4 from IPs 1, 2, IPs 1, 2 issue requests to SC 3 through the intermediary of interface signals 20, 21. SC 3 assigns priorities to the requests from IPs 1, 2, and sends requests to MS 4 through an interface signal 22. MS 4 is a device to store programs and data for use with the programs.

SVP 6 is a device for control of debugging and boottrapping of this information processing apparatus. SVP 6 detects the interior states of IPs 1, 2 from out-side through interface signals 23, 24, and can forcibly change those interior states. CD 7 is a device to operate the SVP 6, and consists of a keyboard and a display. CD 7 is coupled to SVP 6 by an interface signal 25.

Communication means 5 is connected between IP 1 and IP 2 for high speed communication of information about synchronization completion between those processors when a synchronized operation of processes by the processors operating in synchronization with one another.

Description will next be made of the internal configuration of IP 1. IP1 includes an execution controller 10, an instruction executing section 11, a communication controller 12, and a cache storage 13. The cache storage 13 is a high speed storage which is installed in IP and stores part of the contents of MS 4. When IP executes an instruction, IP makes access through SC 3 to MS 4 to read instructions and data from MS 4 into the cache storage 13. The execution controller 10 reads an instruction from the cache storage 13 through an interface signal 15, analyzes the instruction, and when the instruction execution section 11 becomes ready for execution, issues the instruction to the instruction execution section 11 through an interface signal 17.

The execution controller 10 controls arithmetic, memory access and other instructions, including a Wait instruction according to the present invention. Control of this Wait instruction will be described later. The instruction execution section 11 executes instructions sent from the execution controller 10. The communication controller 12 controls communication of synchronization information through the communication means 5 between IPs to enable processes to be performed by IPs operating in synchronization with each other, and receives synchronization information from the instruction execution section 11 through the interface signal 18. The communication controller 12 notifies the completion of synchronization to the execution controller 10 through an interface signal 14. Since IP 2 has the same configuration as IP 1, the communication controller of IP 2 communicates with IP 1 about synchronization information through the communication means 5 between those processors.

Figure 2:
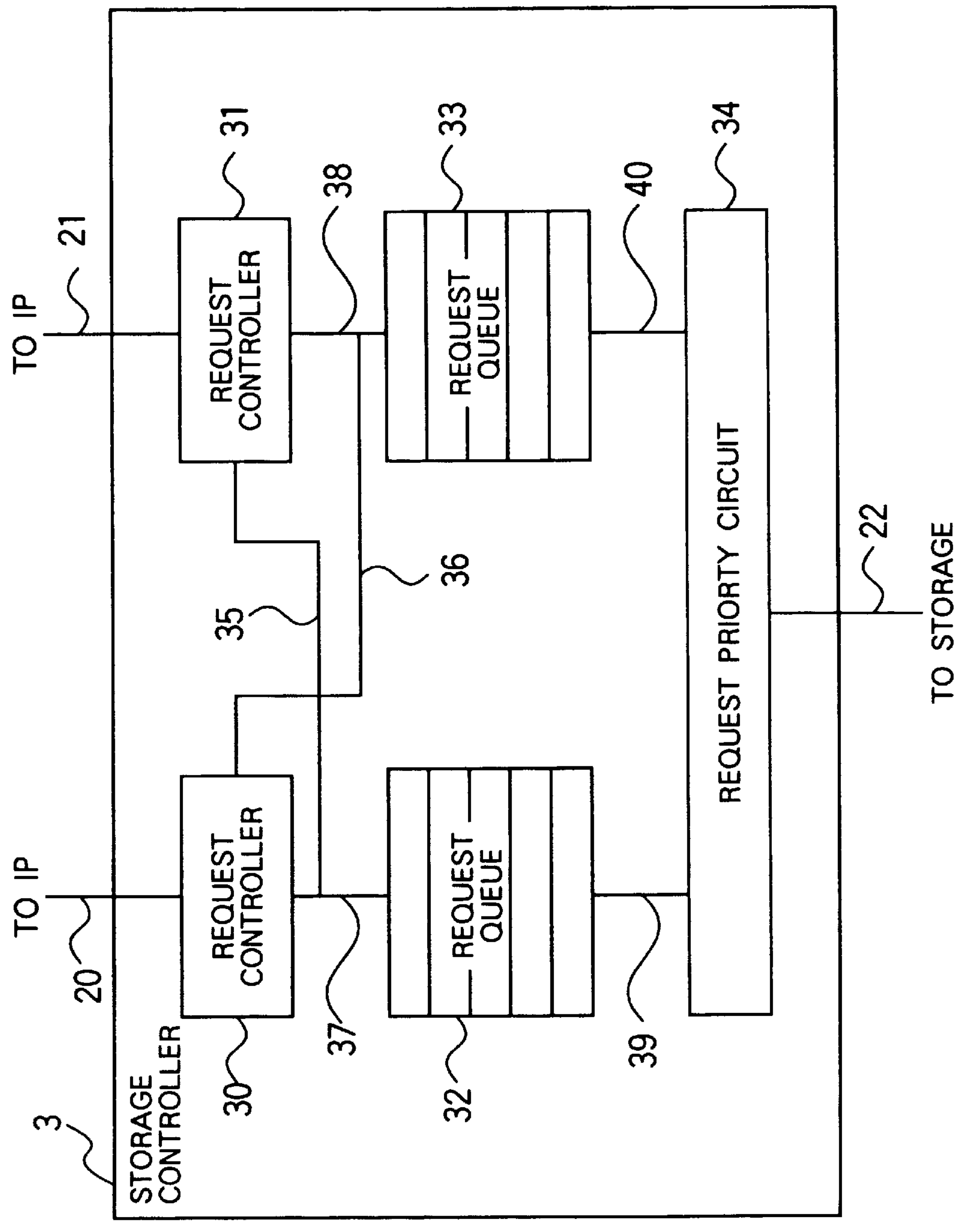
FIG. 2 is an internal block diagram of the main storage controller.

FIG. 2 is an internal block diagram of the storage controller in FIG. 1. SC 3 includes request controllers 30, 31, and a request priority system 34. The request controller 30 receives an access request from the processor 1 sent through an interface signal 20, and sends out the request to the request queue 32 through an interface signal 37. The request queue 32 stacks received requests at the back of the queue temporarily, and sends instructions to the request priority system 34 through an interface signal 39.

Similarly, the request controller 31 receives an access request from the processor 2 through an interface signal 21, and sends the request to the request queue 33 through an interface signal 38. The request queue 33 stacks received requests at the back of the queue temporarily, and sends instructions to the request priority system 34 through an interface signal 40. The request priority system 34 previously assigns priorities to MS access requests sent from the processors 1 and 2 through the interface signals 39, 40, and selects a request from either one of the request queues, and makes access to MS through an interface signal 22. It is possible to arrange a priority system such that in order not to grant excessive access to MS for the requests from one processor, after a predetermined number of successive requests are accepted from one processor, a predetermined number of requests should be accepted from the other processor.

To ensure cache coherency, the request controller 30 accepts requests from the processor 2 through an interface signal 36. When the processor 2 issues a Store request to update MS 4, the request controller 30, through the interface signal 20, notifies the processor 1 of a request to invalidate the corresponding location in the cache in the processor 1. Similarly, the request controller 31 accepts requests from the processor 1 through the interface signal 35. When the processor 1 issues a Store request to update MS 4, the request controller 31, through the interface signal 21, notifies the processor 2 of a request to invalidate the corresponding location in the cache in the processor 2.

Figure 3:
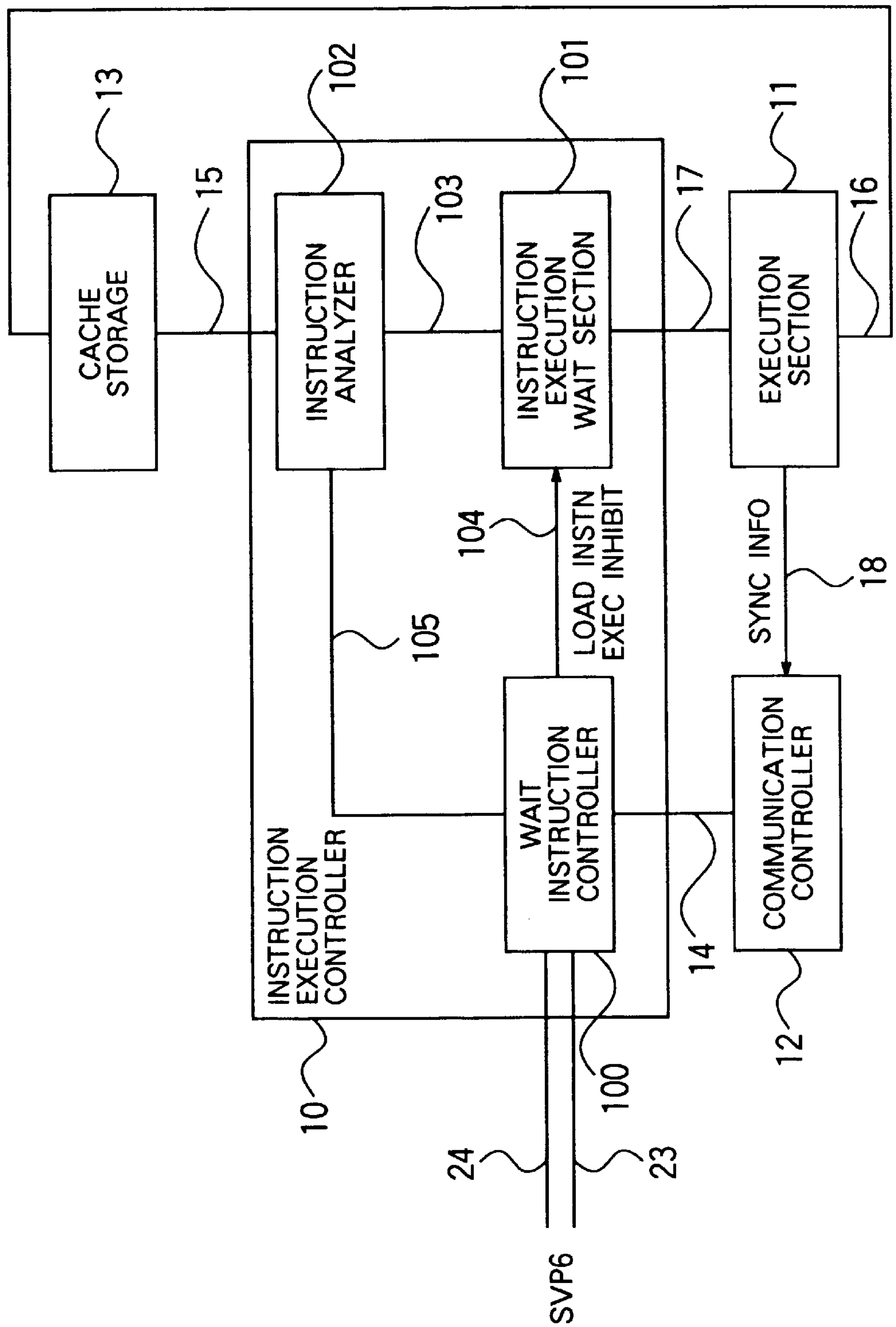
FIG. 3 is an internal block diagram of the execution controller.

FIG. 3 shows the internal configuration of the execution controller 10. The execution controller 10 includes a wait instruction controller 100, an execution wait section 101, and an instruction analyzer 102. The instruction analyzer 102 reads an instruction from the cache storage 13 through the interface signal 15, and analyzes the instruction. If the instruction, which was read out, is an instruction other than a Wait instruction, the instruction analyzer 102 sends the instruction to the execution wait section 101 through the interface signal 103. The execution wait section 101 stacks the received instruction at the back of the queue temporarily, and when the instruction execution section 11 becomes ready for execution, sends the instruction to the instruction execution section 11 through the interface signal 17.

When the instruction, which was read out, is a Wait instruction, the instruction analyzer 102 issues a Wait instruction to the Wait instruction controller 100 through the interface signal 105. The Wait instruction controller 100 executes the Wait instruction which controls the instruction execution sequence according to the present invention. While executing the Wait instruction, the Wait instruction controller 100 continues to send a control signal to inhibit the Load instruction from being sent to the execution wait section 101 through the interface signal 104.

When the communication controller 12 notifies the completion of synchronization through the interface signal 14 to the Wait instruction controller 100, the Wait instruction controller 100 stops the execution of the Wait instruction, and stops sending the control signal to inhibit the execution of the Load instruction which it has sent to the execution wait section 101 through the interface signal 104.

Figure 4:
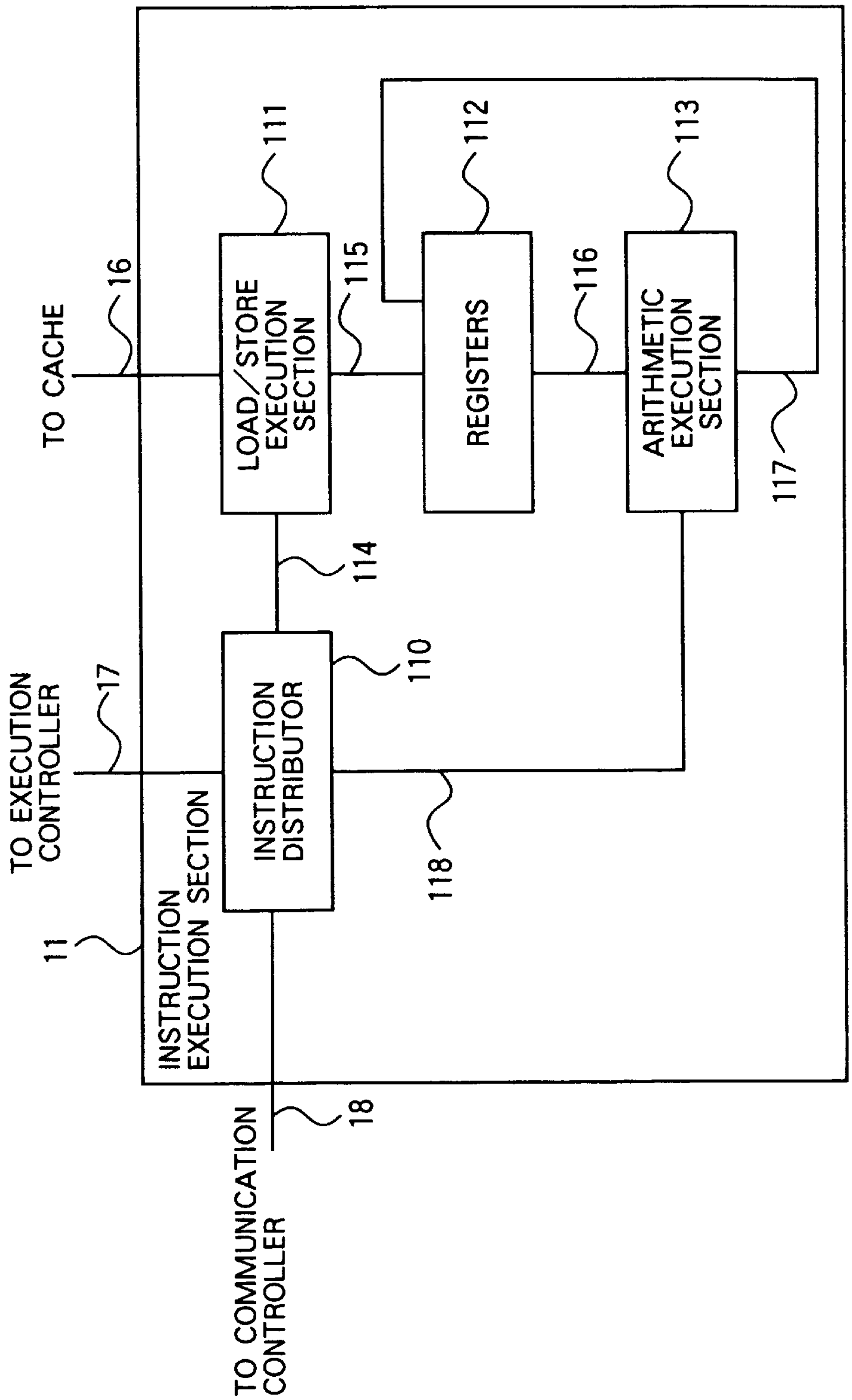
FIG. 4 is an internal block diagram of the instruction executing section.

FIG. 4 shows the internal configuration of the instruction execution section 11. The instruction execution section 11 includes an instruction distributor 110, a Load/Store execution section 111, a group of registers 112 and an arithmetic operation section 113. The instruction distributor 110 distributes instructions, issued from the execution wait section 101, to the Load/Store execution section 111, the arithmetic execution section 113, and the communication controller 12 on the basis of the kinds of instruction. Specifically, when the instruction that has arrived at the instruction distribution section is a Load instruction or a Store instruction, the instruction is sent through the interface signal 114 to the Load/Store execution section 111. When the received instruction is an arithmetic operation instruction, this instruction is sent through the interface signal 118 to the arithmetic execution section 113. When the received instruction is an instruction to give synchronization completion information by use of communication between processors, a signal notifying synchronization completion is sent through an interface signal 18 to the communication controller 12. When a processor ID and a storage location of a Store instruction are stored in a specified address in the main storage, the synchronized-side processor can continue to execute the processes without accepting information about synchronization completion from a processor not associated with the program that it executes.

When receiving a Load instruction, the Load/Store execution section 111 reads data from the cache storage 13 through the interface signal 13, and writes data into the group of registers 112 through the interface signal 115. On the other hand, when receiving a Store instruction, the Load/Store execution section 111 reads data from the group of registers 112 through the interface signal 115, and writes data into the cache storage 13. The arithmetic execution section 113 reads data from the group of registers 112 through the interface signal 116, and writes a result of operation back to the group of registers 112 through an interface signal 117.

Figure 5:
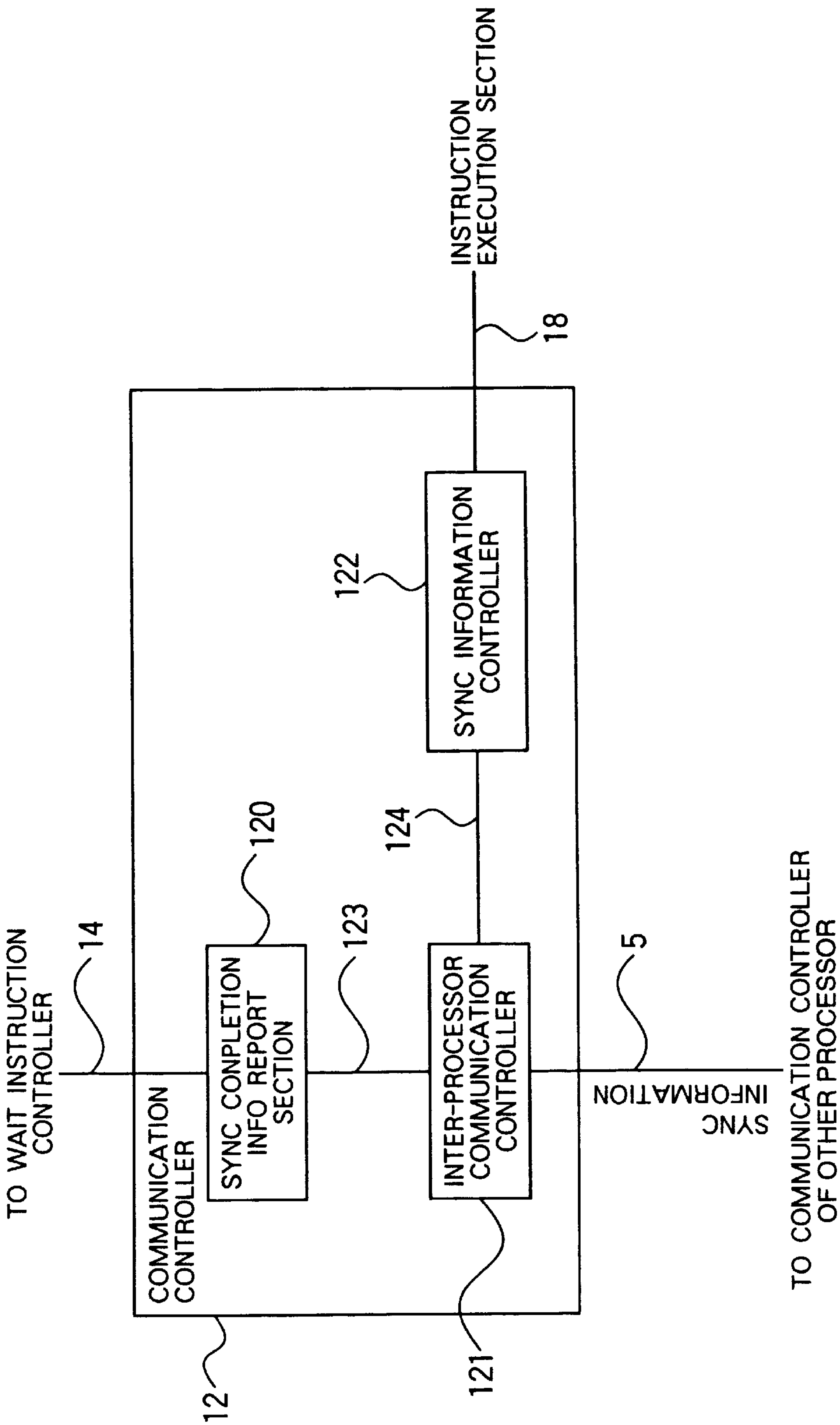
FIG. 5 is an internal block diagram of the communication controller.

FIG. 5 shows the internal configuration of the communication controller 12. The communication controller 12 includes synchronization completion information reporter 120, an inter-processor communication controller 121, and a synchronization information controller 122. On receiving an instruction to give synchronization information from the instruction execution section 11 through the interface signal 18, the synchronization information controller 122 issues synchronization information to the inter-processor communication controller 121 through an interface signal 124.

The inter-processor communication controller 121 transmits received synchronization information to the processor 2 through the communication means 5 between the processors. Synchronization information, which travels through the communication means 5 between the processors, is sent as information about synchronization completion to the synchronization completion information reporter 120 through an interface signal 123. The synchronization completion information reporter 120 reports received synchronization completion information to the execution controller 10.

Figure 6:
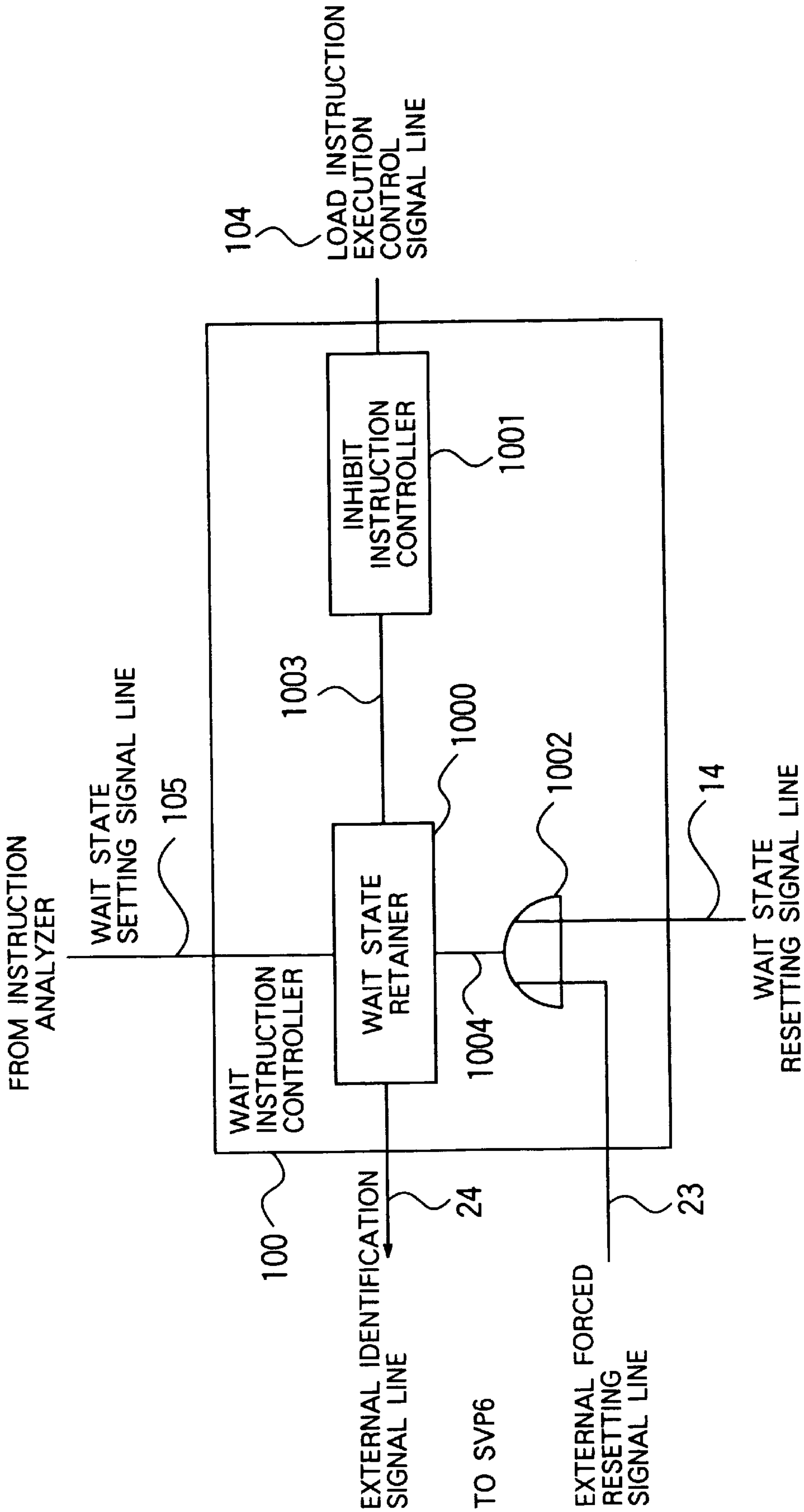
FIG. 6 is an internal block diagram of the wait instruction controller.

FIG. 6 shows the internal configuration of the wait instruction controller 100. The wait instruction controller 100 includes a wait state retainer 1000, an inhibited instruction controller 1001, and an OR circuit 1002. The wait state retainer 1000 is a register to receive a Wait instruction from the instruction analyzer 102 through a wait state setting signal line 105, and store information that the Wait instruction is being executed. The wait state retainer 1000 notifies, through the interface signal 1003, to the inhibited instruction controller 1001 whether or not the wait instruction is being executed.

The state of a Wait instruction being executed can be detected from outside of the processor IP by reading the contents of the register of the wait state retainer 1000 from SVP 6 through an external identification signal line 24.

With regard to the state of a Wait instruction being executed, the register for storing information that a Wait instruction is being executed is reset, and the execution of the Wait instruction is terminated when the value is "true" on the signal line 1004 on which appears as output of the OR circuit a result of ORing between the value of the wait state reset signal line 14 which becomes "true" by information about synchronization completion from the communication controller 12 and the value of the external forced reset signal line 23 from SVP 6, which becomes "true" at the forced termination of the execution of a Wait instruction. If an external signal need not be input, a signal notifying synchronization completion may be input directly to the wait state retainer 1004.

The inhibited instruction controller 1001 sends a control signal to inhibit the Load instruction through the inhibited instruction control signal 104 to the execution wait section 101 on the basis of the state of execution sent from the wait state retainer 1000 through an interface signal 1003.

Figure 7A:
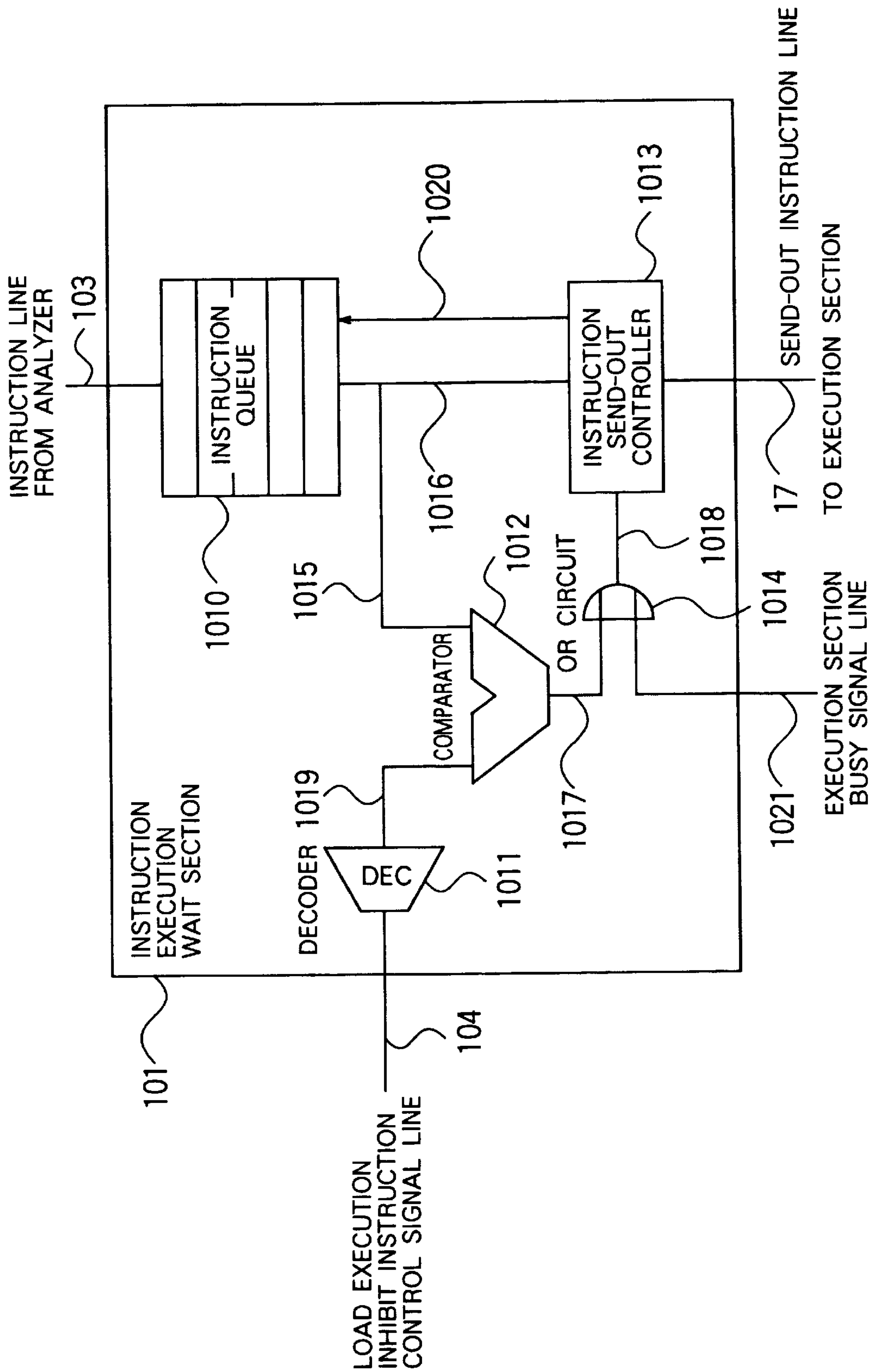
FIGS. 7A and 7B are internal block diagrams of the instruction queues.

FIG. 7A shows the internal configuration of the execution wait section 101. The execution wait section 101 includes an instruction queue 1010, a decoder 1011, a comparator 1012, an instruction send-out controller 1013, and an OR circuit 1014. Instructions sent from the instruction analyzer 102 through the instruction line 103 are stacked first in an instruction queue 1010. The decoder 1011 decodes a control signal sent from the wait instruction controller 100 through the inhibited instruction control signal line 104 to produce an operation code, and the operation code travels along an interface signal line 1019 and its value is used as one input to the comparator 1012.

The other input to the comparator 1012 is the value of one operation code coming through an interface signal 1015 from the instruction queue 1010. The comparator 1012 compares the value of an operation code obtained by decoding with the decoder 1011 and the value of an operation code taken from the instruction queue 1010, and when the two values coincide with each other, outputs "true" to an interface signal 1017.

The OR circuit 1014 produces a result of ORing between the value of the interface signal 1017 as output of the comparator 1012 and the value of the execution section busy signal line which becomes "true" when the execution section 11 is unable to execute. The instruction send-out controller 1013 receives an instruction coming through the interface signal 1016 from the instruction queue 1010, and sends the instruction back into the instruction queue 1010 through the interface signal 1020 when the interface signal 1018 as output of the OR circuit 1014 is "true", or sends the instruction to the execution section 11 through the send-out instruction line 17 when the interface signal 1018 is "false".

Figure 7B:
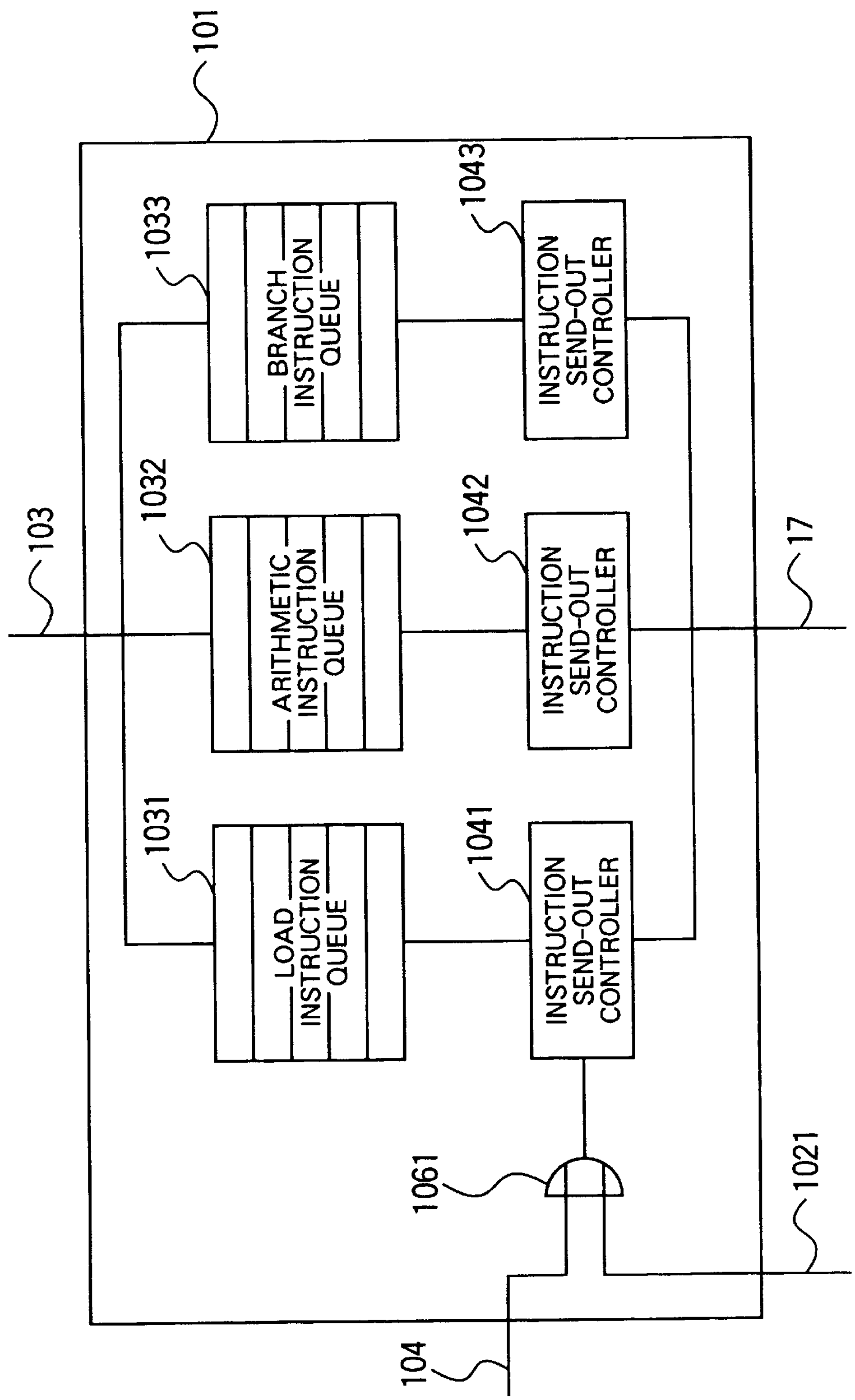

FIG. 7B shows another embodiment of the present invention of the instruction execution wait section 101. Instructions input to the instruction execution wait section 101 through a line 103 are first classified into a Load instruction queue 1031, and other instruction queues 1032, 1033, and then input to instruction send-out controllers 1041 to 1043. Therefore, a Load instruction execution inhibit control signal 104 and an instruction execution section busy signal 1021 are directly input into a gate 1061, and output of the gate 1061 is input to the instruction send-out controller 1041 which is connected to the Load instruction queue 1031. In this case, it is not necessary to provide a circuit in which a comparator and a decoder are connected. The outputs of those instruction send-out controllers 1041, 1042 and 1043 are sent to the instruction execution section 11.

The operation of the Wait instruction according to the present invention will be described briefly using instruction streams of a program for synchronized operations. FIG. 8 shows instruction streams associated with synchronized operations, including an instruction stream of IP 1 which gives synchronization completion information and an instruction stream of IP 2 which is synchronized in a case where IP 1 directs the IP 2 to start its process.

To be more specific, the IP 1 which gives synchronization information executes an ST (Store) instruction (instn. 1), and outputs data of a preliminary process or data of a result of a process to MS 4. Then, a SYNC instruction (instn. 2) is executed, data at the location in the cache on the synchronized-side IP 2 which corresponds to old data is canceled, writing of data into MS 4 is completed, and it is ensured that data is written into a location of MS 4 and that data in the cache of other IPs corresponding to the location being cancelled. The subsequent instructions following the SYNC instruction are issued in IP 2 for execution after the ensurance. Finally, an ST (Store) instruction (instn. 3) is executed, a specified flag is set up in the specified shared area of the storage, in other words, synchronization is indicated to the synchronized-side IP 2.

On the other hand, in the synchronized-side IP 2, by executing a WAIT (Wait) instruction (instn. 4), synchronization completion information is monitored by a specified flag in the specified area of the storage. And, an LD (Load) instruction (instn. 5) is put in the waiting state, an arithmetic instruction (instn. 6) and a Branch instruction (instn. 7), are executed which are not pulled into the waiting state by a Wait instruction. In other words, the instructions up to the one before instruction 8, which requires the result of the Load instruction (instn. 5), are executed by outstripping the instruction 5 in the waiting state. Finally, at a point in time when the completion of synchronization is indicated, the Load instruction (instn. 5) which has been waiting, is executed, data of a preliminary process or a result of a process, which have been stored in MS 4 by the synchronization-notifying P 1, are loaded into IP 2, and instruction 8 which uses the data loaded by instruction 5 is executed.

The feature of high speed with which synchronized operations according to the present invention are performed will be described in detail with reference to an example by comparing it with the prior art.

Figure 11:
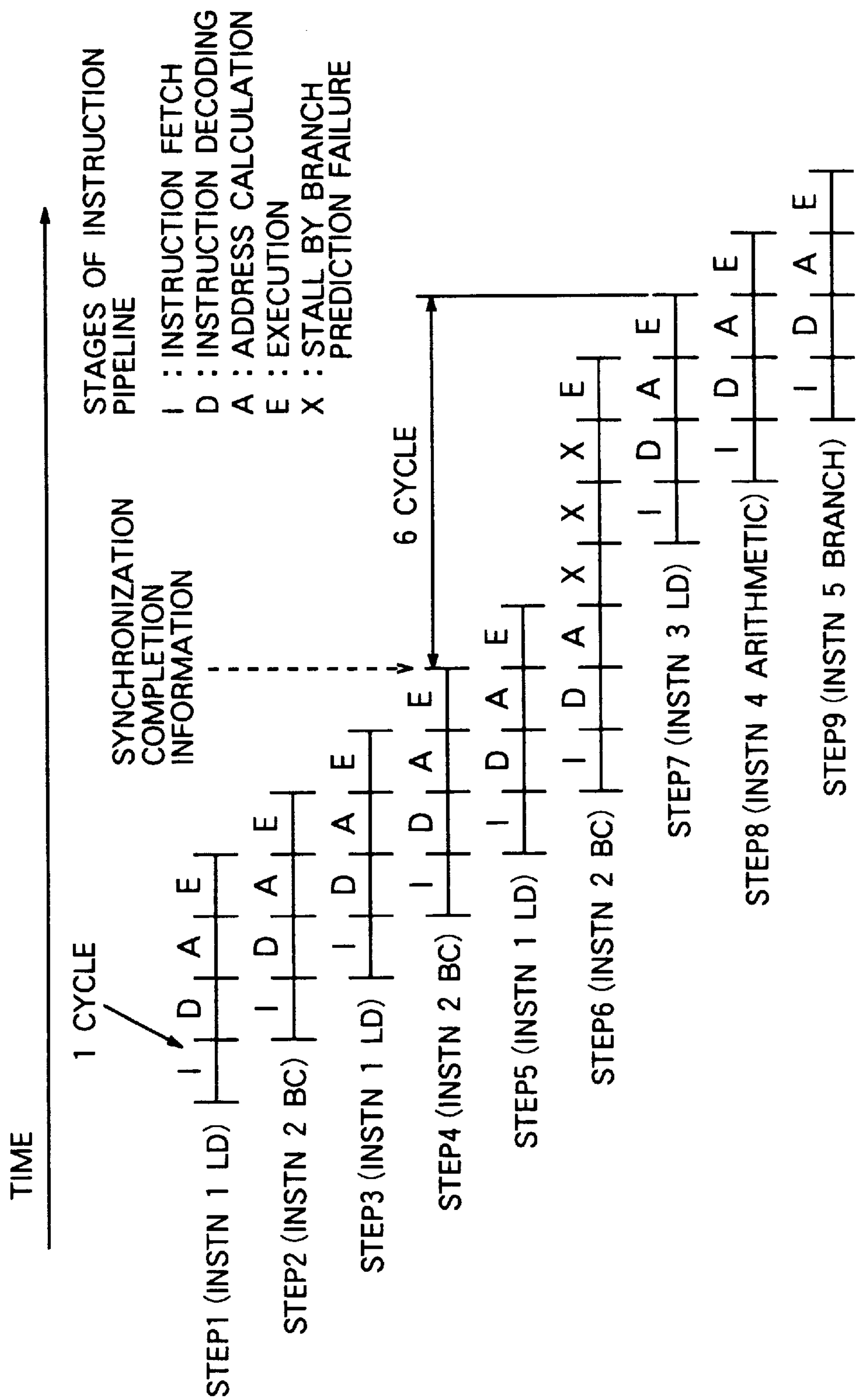
FIG. 11 shows a transition of the instruction execution pipeline when the instruction stream in FIG. 10 is executed.

FIG. 10 shows an instruction stream for the synchronized-side processor monitoring synchronization completion information in the prior art. FIG. 11 shows the transition of the instruction execution pipeline when the instruction stream in FIG. 10 is executed. In FIG. 11, the lapse of time is shown in the horizontal axis direction, while the instructions to be executed successively are shown in the vertical axis direction.

At step 1, LD (Load, instruction 1) for monitoring is injected into the pipeline. At stage I, the LD instruction is taken up; at stage D, the LD instruction is decoded; at stage A, the address is calculated; and at stage E, the LD instruction is executed. By the four cycles (stages), the execution of the LD instruction is completed.

For this while, one cycle after LD, BC (conditional Branch, instruction 1) is injected into the pipeline, and the BC instruction is executed by four cycles. Because synchronization completion information has not been issued by step 4, the conditional Branch instruction causes a branch, by which LD and BC are executed repeatedly to monitor synchronization completion information.

When synchronization completion information is issued while a Load instruction is being executed at step 5, a branch does not occur by the conditional Branch instruction (instn. 2) at step 6, but the next LD instruction (instn. 3) is executed. When synchronization completion information is issued, a prediction of a branch by instruction 2 fails, so that this Branch instruction does not end with four cycles, a penalty for branch prediction failure is added (X stages), it takes seven cycle to execute the Branch instruction. Moreover, due to a disorderliness of the pipeline operation caused by the above failure of branch prediction, the injection of the LD instruction (instn. 3) into the pipe line at step 7 is delayed four cycles with respect to step 6. Consequently, it is six cycles after the information about synchronization completion that the LD (Load) instruction (instn. 3) is finished. After step 7, the instructions of steps 8 and 9 are executed successively.

Figure 13:
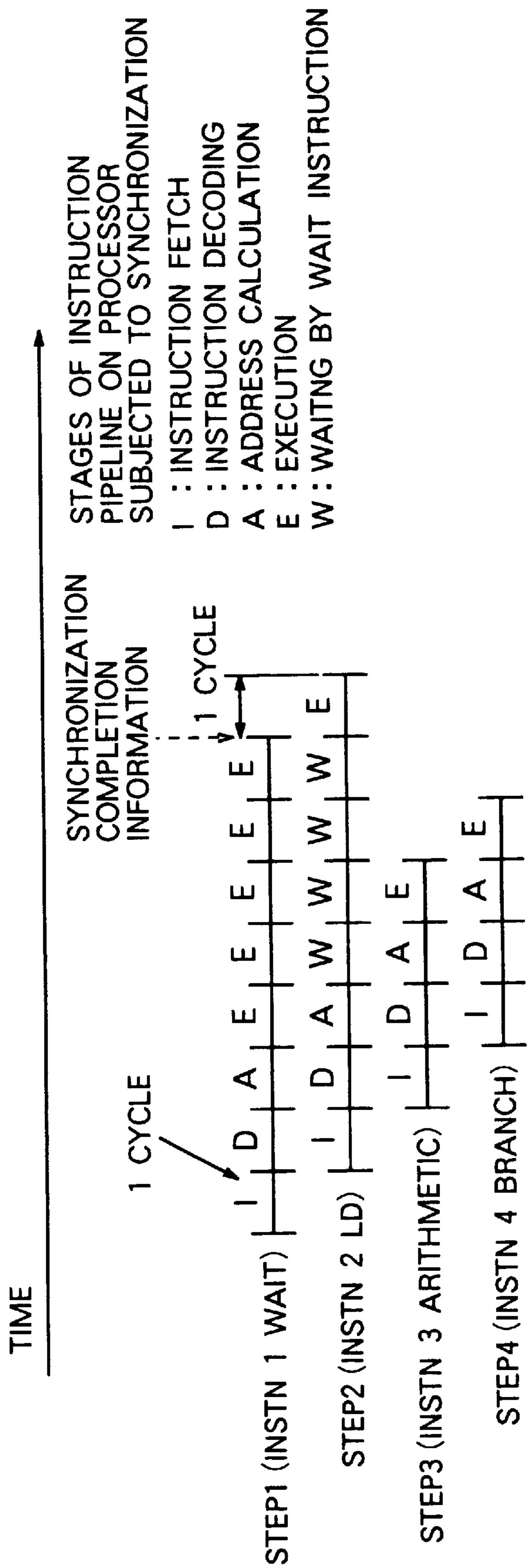
FIG. 13 shows a transition of the instruction execution pipeline when the instruction stream in FIG. 12 is executed.

FIG. 12 shows an instruction stream, including only instructions after WAC, for monitoring synchronization completion information according to the present invention. FIG. 13 shows the transition of the instruction execution pipeline on the synchronized-side processor when the instruction stream in FIG. 12 is executed. In FIG. 12, the passage of time is shown in the horizontal axis direction, while the instructions in the order of execution are shown in the vertical axis direction.

At I stage of step 1, instruction 1 is fetched from the cache storage 13 to the instruction analyzer 102, and the instruction is analyzed at stage D. Since the analysis result shows that instruction 1 is a WAIT instruction to monitor synchronization completion information, the instruction analyzer 102 sends a Wait instruction through the interface signal 105 to the wait instruction controller 100.

In the wait instruction controller 100, at timing corresponding to stage A of address calculation, the next instruction 2 is decoded and found to be an LD instruction which is to be inhibited from being executed. At stage E, the wait instruction controller 100 executes the Wait instruction, and during the execution, continues to send a control signal to the instruction execution wait section 101 to inhibit it from executing the Load instruction. The Wait instruction remains in the execution ON state until another processor issues synchronization completion information.

At step 2, the next LD instruction (instn. 2) is injected into the pipeline delayed one cycle with respect to step 1. At stage I, instruction 1 is fetched from the cache storage 13 to the instruction analyzer 102, and as described above, at stage D the instruction 2 is analyzed. The result of analysis is input through the interface signal 103 to the instruction execution wait section 101. At stage A the instruction execution wait section 101 calculates an address. Since the instruction 2 is a Load instruction, while the Wait instruction is being executed, the comparator in FIG. 7A outputs a "true" signal, the instruction 2 is inhibited from being executed by the instruction execution wait section 101, and at stage W the Load instruction is in the waiting state. In other words, when the instruction is a Load instruction (instn. 2), the processor executes up to the state just before it loads data from MS 4 into the cache, the instruction send-out controller 1013 stacks the LD instruction (instn. 2) at the back of the instruction queue 1010, leaving it as it is in the waiting state.

After the Wait instructions, the instructions other than a Load instruction may be executed, for which reason an arithmetic instruction (instn. 3) and a Branch instruction (instn. 4) are injected into the pipeline and are executed, respectively at step 3 and step 4.

Afterwards, when synchronization completion information is issued from another processor, the wait state reset signal line 14 is set to be "true" through the communication means 5, the wait state retainer 1000 in the wait instruction controller 100 is reset, thus terminating the execution of the Wait instruction. The wait state retainer 1001 stops sending the inhibited instruction control signal 104, and for this reason this decoder 1011 outputs a dummy code which does not coincide with any of the operation codes input to the comparator 1012 from the instruction queue 1010, and the inhibition of the execution of the Load instruction in the instruction execution wait section 101 is released.

The Load instruction is transferred from the instruction execution wait section 101 to the execution section 11, and at stage E, the execution of instructions is resumed, and an instruction to fetch a value from MS 4 is executed. One cycle after the synchronization completion information is issued, the Load instruction (instn. 2) is finished.

As has been described, according to the present invention, the disorderliness of the instruction execution pipeline can be prevented which is attributable to a branch prediction failure of a conditional branch for the conventional spin loop, and instructions which should not be put in the waiting state in the synchronized operations can be executed. Therefore, time for execution can be made shorter by five cycles in the above-mentioned process example than in the prior art.

In the first embodiment mentioned above, the instruction selectively put into the waiting state is the Load instruction, but the present invention is not limited to this arrangement, but instructions other than the Load instruction may be selectively put into the waiting state by specifying by using an operand an instruction which should be inhibited by a Wait instruction in the inhibited instruction controller 1001 in FIG. 6.

[Embodiment 2]

In the wait instruction controller 100 in FIG. 6, the state of the wait state retainer 1000 is notified to the inhibited instruction controller 1001 through the interface signal 1003. In the inhibited instruction controller 1001, when the Wait instruction is put into effect, the operation code of the Load instruction is sent to the instruction execution wait section 101 through the inhibited instruction control signal line 104.

Meanwhile, as an instruction to transfer data from MS 4 to the cache storage 13, there is a Pre-fetch instruction. The inhibited instruction controller 1001 according to this embodiment does not inhibit the execution of the Pre-fetch instruction by a Wait instruction.

FIG. 9 shows an instruction stream, including a Pre-fetch instruction, of IP 1 to indicate synchronization completion and also an instruction stream, including a Pre-fetch instruction, of IP 2 on the synchronized side, those processors being operated in synchronization with each other. The synchronization notifying IP 1 executes an ST (Store) instruction (instn. 1) to write data in MS 4, which data will be transferred to the synchronized-side IP 2. The Store instruction on IP 1 cancels data at the location in the cache storage of IP 2 corresponding to the address of the above-mentioned stored data.

Next, a WAC (Wait Until MS Access Complete—instn. 2) is executed. Access requests based on instructions subsequent to a WAC instruction are stopped in the storage controller until WAC instruction from both queues arrive in line. Therefore, WAC instructions by a plurality of IPs ensure the order of MS accesses before and after the WAC instruction in all IPs. The function of a WAC instruction is as follows. Referring to the request queues 32, 33 in SC 3 shown in FIG. 2, when a WAC request is sent out from one request queue to the request priority system 34, this WAC request is made to wait until a WAC request is sent out. During this waiting time, requests stacked in the other request queue are processed are they pass the request priority system. When WAC requests from both request queues arrive, the normal priority is restored.

As has been described, an MS access request issued after a WAC instruction is thus prevented from being executed before an MS access request issued before the WAC instruction. The WAC instructions in the storage controller together play the role of a threshold for the succeeding instructions.

IP 1 which issues synchronization completion information executes an ST (Store) instruction (instn. 3), and sends synchronization completion information to IP 2 on the synchronized side. In the synchronized-side IP 2, the WAC instruction (instn. 4) and the WAC instruction (instn. 2) serve to prevent an MS access instruction issued later from outstripping an MS access instruction issued ahead of the WAC instruction in the order of execution.

Next, a WAIT (Wait) instruction (instn. 5) is executed, and the subsequent Load instruction (instn. 7) is made to wait in the IP 2 until synchronization completion information is issued. However, a Pre-fetch instruction (instn. 6) is not made to wait by a Wait instruction (instn. 5). Meanwhile, due to the presence of a WAC instruction in IP 1 and a WAC instruction in IP 2, instructions are synchronized in the storage controller, so that the storage of instruction 1 has been finished. Therefore, data of a process can be read from MS 4 into the cache storage 13. A LD (Load) instruction (instn. 7) is made to wait by a Wait instruction (instn. 5) until synchronization completion information is issued. When IP 1 issues synchronization completion information through the communication means 5, IP 2 reads data stored by the synchronization-notifying IP 1. In actuality, however, data, which should be read by a Load instruction (instn. 7) to be executed after synchronization completion information has been issued, has already been transferred to the cache storage 13 from MS 4 by a Pre-fetch instruction (instn. 6). Therefore, data is read from the cache storage 13. For this reason, data can be read at higher speed into the group of registers 112 than it is read from MS 4. If there is not the Wait instruction mentioned above, when the contents in the area into the synchronization-notifying IP 1 stores data have been put into the cache storage of the synchronized-side IP 2, wrong data is read from the cache storage so long as a Load instruction (instn. 7) is used. Therefore, when executing a Load instruction, it is necessary to use a Wait instruction to monitor synchronization completion information.

[Embodiment 3]

In the information processing apparatus in FIG. 1, SVP 6 is connected to IP 1 and IP 2 through the external identification signal line 24. SVP 6 is operated from CD 7 through the interface signal 25. The external identification signal line 24 is connected to the wait state retainer 1000 in IP as described with reference to FIG. 6.

When the wait state is detected from outside, the number of the processor 1 or the processor 2 is designated from DC 7 to the service processor SvP through the interface signal 25. Next, SVP 6, which has received a designation of a processor to detect the wait state in it, reads the register of the wait state retainer 1000 in the processor IP which has its processor number designated through the external identification signal line 24. The wait state thus read is output to CD 7 through the interface signal 25.

In the manner as described, it is possible to detect from outside of IP whether or not a Wait instruction is being executed. This embodiment 3 is effective in debugging the information processing apparatus or an operating system (OS) or compiler software.

[Embodiment 4]

In the information processing apparatus shown in FIG. 1, SVP 6 is connected to IP 1 and IP 2 through the external forced reset signal line 23. SVP 6 is operated from CD 7 through the interface signal 25. The external forced reset signal line 23 is connected to the OR circuit 1002 inside IP as described with reference to FIG. 6. Output 1004 of the OR circuit 1002 is connected in the wait state retainer 1000.

When forcibly terminating the execution of a Wait instruction from outside, the number of the processor 1 or the processor 2 is designated from DC 7 to SVP 6 through the interface signal 25. Next, SVP 6, which has received a request to forcibly terminate the execution of a Wait instruction, sends through the external forced signal line 23 a "true" signal to terminate the execution of the Wait instruction of the designated processor.

The OR circuit 1002, which has received a signal of "true", outputs a "true" signal as the result of ORing to the interface signal 1004. The wait state retainer 1000, which has received the value of "true" through the interface 1004 of the OR circuit 1002, resets the register having information that a Wait instruction is being executed to terminate the execution of the Wait instruction.

In this embodiment, the execution of a Wait instruction can be terminated forcibly from outside and, therefore, this embodiment is effective in debugging the information processing apparatus or an operating system (OS) or compiler software.

What is claimed is:

1. In an information processing system having a plurality of processors connected to a common storage and processing respective programs, a processor for executing an instruction to store data in said common storage and an instruction to load data from said common storage into a cache storage, comprising:

a communication controller for receiving synchronization information from a processor which has detected a SYNC instruction to achieve synchronization of execution of instructions among a plurality of processors;

an instruction executing section for detecting a specified change of the flag of a specified location in the common storage by executing a Monitor instruction included in a program in response to said synchronization information from said communication controller;

an execution controller to execute subsequent instructions after said Monitor instruction, exclusive of a Load instruction to load data into a cache storage, until a change of the flag is detected by said execution section, wherein said processor allows said instruction for loading data from said common storage into said cache storage to be executed after said flag detection.

2. A processor according to claim 1, further comprising:

an instruction queue for storing instructions to be executed in said processor;

an operation code circuit, connected to said instruction queue, for converting a signal corresponding to a change of said flag into an operation code of said load instruction;

a comparator for comparing output of said operation code circuit and output of said instruction queue and issuing a coincidence signal when those outputs coincide with each other; and an instruction inhibiting circuit, connected to said comparator circuit and said instruction queue, for controlling said instruction inhibiting circuit and said instruction queue not to sent an instruction output from said instruction queue to said instruction execution section in response to a coincidence signal.

3. A processor according to claim 2, wherein said instruction execution section reads a processor ID of a processor which has given said synchronization information from a specified address of said common storage.

4. A processor according to claim 2, further comprising an inhibit resetting circuit for issuing an inhibit instruction control signal to terminate the instruction send-out inhibiting action of said instruction inhibiting circuit by an input signal.

5. An information processing system, connected to a common storage, for executing programs by processors, said information processing system comprising:

a common storage;

a plurality of processors, connected to said common storage, each said processor executing an instruction to store data in said common storage and an instruction to load data from said common storage into a cache storage, wherein said processor comprises a communication controller which, on detecting a synchronize instruction to achieve synchronization for execution of instructions among a plurality of processors, sends synchronization completion information, and receives synchronization completion information from another processor;

an instruction execution section for checking specified changes of a flag at a specified location of said common storage by executing a monitor instruction included in a program according to said synchronization completion information from said communication controller; and an instruction execution controller for executing instructions subsequent to said monitor instruction, exclusive of an instruction to load data from said common storage into said cache, until a flag change is detected by said instruction execution section, wherein said instruction controller, after detecting a change of the flag, permits the execution of an instruction to load data from said common storage.

6. An information processing system according to claim 5, further comprising a storage controller connected between each said processor and said common storage, including a plurality of request controllers each connected to said processor, for sending a store request from a given processor to said common storage, and also sending a signal for invalidating a data location corresponding to said store request in a cache storage in one other processor other than said given processor to a request controller connected to said one other processor.

7. An information processing apparatus according to claim 6, wherein said storage controller includes a priority circuit, connected between said common storage and said request controllers, for selecting one of a plurality of requests from said plurality of request controllers according to specified priority.

8. An information processing system according to claim 5, wherein said processor further comprises:

an instruction queue for storing instructions to be executed in said processor;

an operation code circuit, connected to said instruction queue, for changing a signal corresponding to said change of the flag into an operation code of said load instruction;

a comparator circuit for comparing output of said operation code circuit with output of said instruction queue, and when both outputs coincide with each other, issuing a coincidence signal; and an instruction inhibit circuit, connected to said comparator circuit and said instruction queue, for controlling them so as no to send an instruction output from said instruction queue to said instruction execution section according to said coincidence signal.

9. An information processing system according to claim 8, wherein said instruction execution section reads a processor ID of a processor, which has issued said synchronization completion information, from a specified address of said common storage.

10. An information processing system according to claim 8, wherein said execution controller includes an inhibit resetting circuit for issuing an inhibit instruction control signal to terminate the instruction send-out inhibiting action of said instruction inhibiting circuit by an input signal.

11. In an information processing system having a plurality of processors, connected to a common storage, each processor executing a program, a data access method by which a given processor stores data in said common storage and another processor loads said data from said common storage into said cache storage, said access method comprising the steps of:

outputting synchronization completion information for attaining synchronization for execution of instructions among a plurality of processors from a given processor;

according to said synchronization completion information, checking specified changes of a flag in a specified location of said common storage by executing a monitor instruction included in a program in another processor;

executing instructions subsequent to said monitor instruction, exclusive of an instruction to load data from said common storage into said cache storage, until a flag change is detected by said execution section; and after a flag change is detected, permitting the execution of an instruction to load data from said common storage into said cache storage.

12. A data access method according to claim 11, further comprising the steps of:

storing an instruction to be executed in said processor in a queue;

changing a signal corresponding to aid flag change into an operation code of said load instruction;

comparing said operation code with output of said instruction queue, and when coincidence occurs, issuing a coincidence signal; and according to said coincidence signal, controlling so that an instruction output from said queue is not sent to said execution section.

13. A data access method according to claim 12, further comprising the step of:

reading a processor ID of a processor which has issued said synchronization completion information from a specified address of said common storage.

14. A data access method according to claim 12, further comprising the step of:

issuing an inhibit instruction control signal to terminate the instruction send-out inhibiting action by an input signal.

* * * * *